March 29, 1966   M. D. GIBSON   3,243,073
SPOT WELDED BALL SEAL
Filed March 6, 1964

INVENTOR.
MILFORD D. GIBSON

BY

… …

United States Patent Office 3,243,073
Patented Mar. 29, 1966

---

3,243,073
SPOT WELDED BALL SEAL
Milford D. Gibson, La Mirada, Calif., assignor to North American Aviation, Inc.
Filed Mar. 6, 1964, Ser. No. 350,025
7 Claims. (Cl. 220—24)

This invention relates to a means for hermetically sealing pressure vessels and more particularly to a means for hermetically sealing precision instruments such as gyroscopes, velocity meters, accelerometers or any other type of gas or liquid filled instrument.

Present sealing methods generally employ threaded fill plugs with O rings, or "Pinch Off" capillary tubes. The threaded plug and O-ring seal is a source of contamination and is not a true hermetic seal. In small instruments particularly, the capillary tube is cumbersome and difficult to protect from physical damage.

It is therefore an object of this invention hermetically to seal pressure vessels and the like.

It is therefore another object of this invention hermetically to seal precision instruments.

It is also an object of this invention to provide an efficient, cheap, and simple means for hermetically sealing precision instruments.

Another object of this invention is to provide a seal that may be reused when the instrument has to be disassembled for repairs.

Another object of this invention is to provide a protective means such that physical damage to the sealing means is kept at a minimum.

Further objects and advantages of the invention will be apparent from the following description taken in conjunction with the accompanying drawings, wherein.

Figure 1:
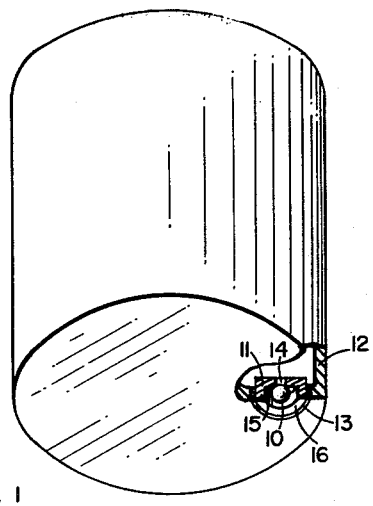
FIG. 1 is a sectional view illustrating a pressure vessel with an inert and ball seal for hermetically sealing the vessel.
Figure 2:
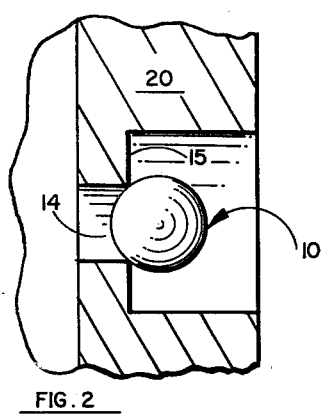
FIG. 2 is a sectional view illustrating a counterbored hole in the wall of a pressure vessel and a ball for hermetically sealing the vessel.

Referring to FIG. 1, a gyroscope case 12 is to be filled with liquid and sealed. The demands for extreme accuracy and predictability over long operating times formulates a requirement that the hermetic seal must not leak under severe operating conditions. Although a gyroscope case 12 and an accelerometer case 20 are shown in FIGS. 1 and 2 respectively for purposes of illustration, it is to be understood that any vessel requiring a sealing means may be substituted for case 12 or case 20. Insert 11 is made from any material that is capable of being welded. The insert 11 is formed in the shape of right circular cylinder having a fill hole 14 through its center. One end of insert 11 is counterbored to define a recess 16. A steel ball 10 having a larger diameter than the defined hole, and a smaller diameter than the defined recess is placed butting against the surface formed by the juncture of the surface defining the hole and the surface defining the recess.

An insert 11 as shown in FIG. 1 is used when the vessel material is of the type that does not lend itself to resistance or other welding techniques. One such material is aluminum.

Figure 3:
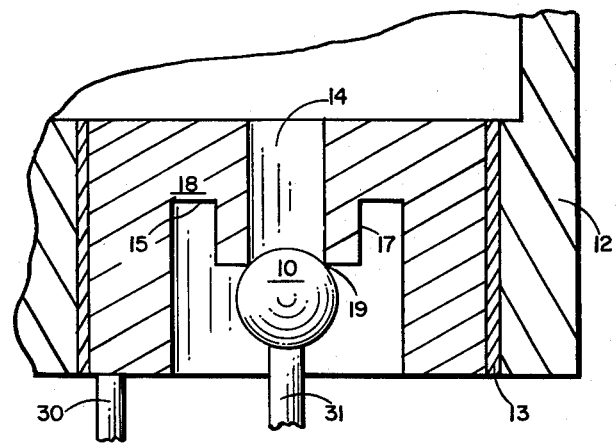
FIG. 3 is a sectional view of the ball seal insert showing the sealing ball engaged between the insert and one of the welding electrodes and the positioning of the second welding electrode.
Figure 5:
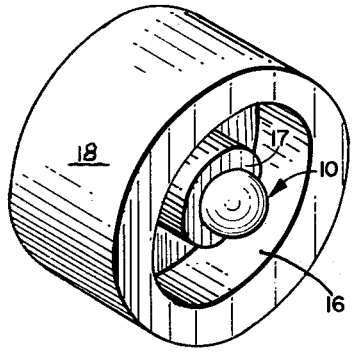
FIG. 5 is a perspective view of the ball sealing device which shows the general physical construction and relationship of the sealing ball, insert and vessel wall.
Figure 4:
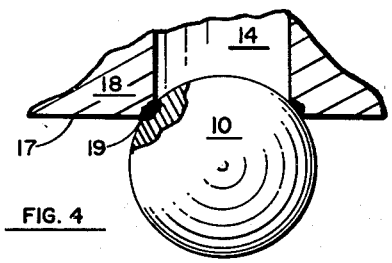
FIG. 4 is a cross sectional view of the ball seal and the inner rim of the ball seal insert showing the welding bond between the two.

A particular gas or liquid having been placed within the case 12, electrodes 30 and 31 as shown in FIG. 3 are butted against insert 11 and sealing ball 10 respectively. The electrodes 30 and 31 are energized to resistance weld the sealing ball 10 to the insert 11. The weld (bonding means) results in the metal of insert 11 and sealing ball 12 fusing together to form one integral part effecting a permanent seal.

FIG. 2 is another embodiment of the invention which does not use the insert 11. The vessel wall 20 is counterbored to form a recess 15 having a larger diameter than sealing ball 10. A filling hole 14 is made in wall 20. Filling material such as a gas or liquid is inserted into vessel 20. The steel ball 10 is butted against the hole 14. Welding electrode 31 is butted against the ball 10 and electrode 30 is butted against the vessel wall 20. The electrodes are energized effecting a weld and hermetic seal between the wall 20 and the ball 10. The counterbored hole 15 serves a dual purpose, first it provides a protective rim about the ball 10, which prevents the ball from being accidently knocked off and secondly the rim acts as a leverage point to pry the ball off if it is necessary to open and refill the vessel. A tamper proof and protected seal may be made by placing a suitable sealing compound (potting compound) in the counterbored hole 15 after the spot welding operation.

FIG. 3 illustrates an insert 18 that is similar to insert 11. The counterbored hole 15 is machined in such a manner that a hollow cylindrical ridge member 17 is left remaining in the center of member 18. The cylindrical ridge member 17 supplies material for successive sealings. Hole 14 becomes chamfered and ragged when the ball 10 is pried off of insert 18, which results in additional welding power requirements to produce a second seal. This can be eliminated by the design shown in FIG. 3. The chamfer would be removed by a spot facing operation. The facing operation removes material from cylindrical ridge member 17 to create a clean flat sealing surface. A new steel ball 10 is then placed on the hole 14 in ridge member 17 and resistance welded in place. Numerous replacements are made possible by this configuration before a new insert 18 is required.

Insert 11 is bonded by cement 13 to aluminum housing 12. The cement used in a conductive cement called LCA-12, but other cements and bonding methods may be used satisfactorily. The insert material used was KR-monel and MU-metal. Successful tests have been made with a monel and a steel ball. Typical sizes of components are .078 dia. fill hole, ¼ inch diameter counterbore, and ⅛ inch ball. Welding can be performed with standard equipment such as a Unitek-Weldmatic. Good results can be achieved with a welding electrode pressure of 25 pounds, and power settings of 60 to 100 watt seconds.

It will be obvious to those skilled in the art that various changes may be made in this invention without departing from the spirit and scope thereof and therefore this invention is not limited by that which is shown in the drawing and described in the specification but only as indicated in the appended claims.

I claim:
1. In combination:
   a vessel defining a circular hole; a ball having a larger diameter than said circular hole; means interposed between said ball and said vessel defined circular hole affixing said ball to said circular hole to effect a hermetic seal.
2. In combination:
   a vessel for containing gases;
   a first circular hole defined by the wall of said vessel;
   sealing means comprising;
   a right circular cylindrical insert member having an outside diameter slightly smaller than the diameter of said first hole, said insert member also defining a second circular hole through its axial center;

a sealing ball having a diameter slightly larger than said second hole, bonding means for hermetically bonding said insert member into said first hole; bonding means interposed between said ball and said insert members defined second circular hole affixing said ball to the opening of said second hole.

3. In combination:

a vessel wall defining a first circular hole through said wall;

a second circular hole partially through said vessel wall having a larger diameter than said first hole, and superimposed over said first hole;

a sphere, having a diameter larger than said first hole and smaller than said second hole; bonding means interposed between said sphere and said vessel wall defined first hole affixing said sphere to said first hole so as to achieve a hermetic seal.

4. In combination:

an instrument housing, a circular hole through said housing and being defined by said housing; a sealing means, said means comprising a ball having a larger diameter than said hole; bonding means interposed between said ball and said defined circular hole for bonding said ball to said hole.

5. In combination:

an instrument housing, a first circular hole through said housing and being defined by said housing;

an insert means, said means comprising a right circular cylinder member having an outside diameter slightly smaller than the diameter of said first hole, a second hole defined by said cylinder member and through the axial center of said cylinder member;

means for bonding, hermetically, said insert means into said first hole;

a ball having a larger diameter than said second hole;

means interposed between said ball and said second defined hole for bonding, hermetically said ball to said second hole.

6. The combination as described in claim 5, wherein the insert member has a counterbored hole slightly larger in diameter than said ball and is superimposed over said second hole, said counterbored hole being partially through said insert member and defined by said insert member.

7. In combination:

an instrument housing, a first circular hole through said housing and being defined by said housing;

an insert means, said means comprising a right circular cylinder member having an outside diameter slightly smaller than the diameter of said first hole, a second hole defined by said cylinder member and through the axial center of said cylinder member, and further comprising a counterbored hole which is larger in diameter than said ball and is superimposed over said second hole, said counterbored hole being partially through said insert member and defined by said insert member, said insert member also having a circular cylindrical ridge projecting from the bore of the counterbored hole, said ridge projection being symmetrically located over said second hole and having an inside diameter equal to said second hole, and an outside diameter less than said counterbored hole, said projection extending a distance less than to the open end surface of said insert means;

means for bonding, hermetically, said insert means into said first hole;

a ball having a larger diameter than said second hole;

means interposed between said ball and said cylinder members second defined hole for bonding, hermetically said ball to said second hole.

References Cited by the Examiner
UNITED STATES PATENTS 2,171,588  9/1939  McGuffey _____ 220—44
2,746,473  5/1956  Ottlinger _____ 220—44

THERON E. CONDON, *Primary Examiner.*

LOUIS G. MANCENE, *Examiner.*

G. T. HALL, *Assistant Examiner.*